United States Patent
Asonuma et al.

(10) Patent No.: US 10,815,443 B2
(45) Date of Patent: Oct. 27, 2020

(54) METHOD FOR OPERATING FUEL GAS MANUFACTURING DEVICE

(71) Applicant: Osaka Gas Co., Ltd., Osaka-shi (JP)

(72) Inventors: Hidaka Asonuma, Osaka (JP); Tsubasa Shimizu, Osaka (JP); Takaya Kanda, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 16/494,406

(22) PCT Filed: Mar. 23, 2018

(86) PCT No.: PCT/JP2018/011889
§ 371 (c)(1),
(2) Date: Sep. 16, 2019

(87) PCT Pub. No.: WO2018/174277
PCT Pub. Date: Sep. 27, 2018

(65) Prior Publication Data
US 2020/0048570 A1    Feb. 13, 2020

(30) Foreign Application Priority Data

Mar. 23, 2017  (JP) ................................. 2017-057455

(51) Int. Cl.
*C10L 3/12* (2006.01)
*B01D 53/26* (2006.01)
*C10L 3/10* (2006.01)

(52) U.S. Cl.
CPC ............... *C10L 3/12* (2013.01); *B01D 53/26* (2013.01); *C10L 3/103* (2013.01); *C10L 2290/08* (2013.01); *C10L 2290/10* (2013.01); *C10L 2290/542* (2013.01)

(58) Field of Classification Search
CPC .......... B01D 2253/108; B01D 2256/16; B01D 53/053; B01D 2253/102; B01D 2253/104; B01D 2253/106; B01D 2257/504; B01D 2257/7025; B01D 2257/80; B01D 2259/40035; B01D 2259/403; B01D 2259/404; B01D 2259/414; B01D 53/047; B01D 53/0476; B01D 53/26; B01J 8/0492; B01J 8/0496; C10G 9/36; C10L 2290/08; C10L 2290/10; C10L 2290/542; C10L 3/103; C10L 3/12
See application file for complete search history.

(56) References Cited

U.S. PATENT DOCUMENTS 7,866,161 B2    1/2011  Mahlanen et al.

FOREIGN PATENT DOCUMENTS

| JP | 4159393 A | 6/1992 |
|----|-----------|--------|
| JP | 726271 A | 1/1995 |
| WO | 2017150600 A1 | 9/2017 |

*Primary Examiner* — Sharon Pregler
(74) *Attorney, Agent, or Firm* — The Webb Law Firm

(57) ABSTRACT

Provided is a method for operating a fuel gas manufacturing device for stopping the operation in such a manner that the operation can be immediately resumed, while keeping facilities from becoming complex. When stopping the operation while supply of source gas to a desulfurizing unit is stopped, after supply of source gas to the desulfurizing unit and discharge of fuel gas to the outside are stopped, a standby operation process is performed in which fuel gas is circulated by a circulation driving unit in such a manner that the whole amount of fuel gas passed through a moisture removing unit is circulated through a circulation gas path to return to the desulfurizing unit and the circulated fuel gas is heated by a heating unit to a set standby temperature to heat a reforming unit to a temperature that is equivalent to an operation temperature at which reforming is performed, and supply of water vapor is continued in a state where a supply amount of water vapor is at least an amount with which carbon deposition due to thermal decomposition of fuel gas can be prevented and is smaller than an amount that is supplied when reforming is performed.

4 Claims, 3 Drawing Sheets

[ Standby operation state ]

METHOD FOR OPERATING FUEL GAS MANUFACTURING DEVICE

CROSS-REFERENCE TO RELATED APPLICATIONS

This application is the United States national phase of International Application No. PCT/JP2018/011889 filed Mar. 23, 2018, and claims priority to Japanese Patent Application No. 2017-057455 filed Mar. 23, 2017, the disclosures of which are hereby incorporated by reference in their entirety.

TECHNICAL FIELD

The present invention relates to a method for operating a fuel gas manufacturing device that includes a desulfurizing unit that desulfurizes source gas that is heavy hydrocarbon gas, a reforming unit that reforms desulfurized source gas supplied from the desulfurizing unit by using water vapor to produce fuel gas that contains methane as a main component, a fuel gas return path for returning a portion of the fuel gas supplied from the reforming unit to the desulfurizing unit, and a moisture removing unit that removes moisture contained in the fuel gas supplied from the reforming unit.

BACKGROUND ART

The above-described fuel gas manufacturing device produces fuel gas containing methane as a main component by reforming heavy hydrocarbon gas such as propane, butane, or the like, and the produced fuel gas is used as fuel in an internal combustion engine such as a gas engine, a gas turbine, or the like (see Patent Document 1, for example).

Incidentally, in the above-described fuel gas manufacturing device, even if source gas contains sulfur components, for example, a reforming catalyst in the reforming unit can be kept from being poisoned by the sulfur components, as a result of the source gas being desulfurized using hydrogen components that are contained in fuel gas returned through the fuel gas return path.

Also, as a result of unnecessary moisture being removed from the fuel gas by the moisture removing unit, the occurrence of problems, such as operation failure of the internal combustion engine, can be suppressed.

Although Patent Document 1 does not describe an operation method for stopping the operation while the supply of source gas to the desulfurizing unit is stopped, Patent Document 1 describes, when starting the operation, removing oxygen from the system by performing purging using nitrogen gas as inert gas, and thereafter heating nitrogen gas used for purging and the reforming unit by using an electric heater while circulating the nitrogen gas through the desulfurizing unit and the reforming unit, and accordingly, it can be considered that, when the operation is stopped while the supply of source gas to the desulfurizing unit is stopped, the desulfurizing unit and the reforming unit are cooled to a normal temperature and the system is opened to an atmosphere.

PRIOR ART DOCUMENTS

Patent Documents

Patent Document 1: U.S. Pat. No. 7,866,161

DISCLOSURE OF THE INVENTION

Problem to be Solved by the Invention

If the desulfurizing unit and the reforming unit are cooled to a normal temperature when the operation is stopped while the supply of source gas to the desulfurizing unit is stopped, there is a problem in that the operation for producing fuel gas cannot be immediately resumed because it takes a long time to increase the temperatures of the desulfurizing unit and the reforming unit.

For example, if an LPG (Liquefied Petroleum Gas) transport ship is equipped with a fuel producing device that serves as a system for supplying fuel to an internal combustion engine that drives accessories such as an air conditioner, a generator, and the like, it is desirable that fuel can be immediately supplied when operation of the accessories is started, but if the desulfurizing unit and the reforming unit are cooled to a normal temperature, fuel gas cannot be immediately supplied.

In order to immediately resume the operation for producing fuel gas, consideration can be given to keeping the fuel producing device operating while reducing the supply amount of source gas to the minimum, but in this case, there is a problem in that the source gas and water vapor are continuously wasted, and therefore this method is difficult to use in practice.

Incidentally, in some cases, a large amount of water vapor can be supplied in an LPG (Liquefied Petroleum Gas) transport ship by using various kinds of exhaust heat, for example, and in such a case, water vapor can be continuously consumed, but wasting of source gas needs to be avoided.

As another operation method for immediately resuming the operation for producing fuel gas, consideration can be given to performing purging inside the system using nitrogen, and thereafter heating nitrogen gas and the like using an electric heater while circulating nitrogen used for purging through the desulfurizing unit and the reforming unit, to keep the desulfurizing unit and the reforming unit at high temperatures while suppressing the consumption of source gas and water vapor.

In this case, however, every time the operation is stopped, nitrogen is required for purging and, furthermore, nitrogen gas contains a small amount of oxygen and therefore it is necessary to supply hydrogen gas to remove oxygen in order to suppress oxidation of a reforming catalyst or the like, and there arises a problem in that facilities become complex because facilities for storing nitrogen and hydrogen gas are necessary.

If a ship such as an LPG transport ship is equipped with tanks for storing nitrogen for purging and hydrogen gas for removing oxygen, facilities of the ship become complex, and therefore this method is also difficult to use in practice in a ship such as an LPG transport ship.

The present invention was made in view of the above circumstances, and an object of the present invention is to provide a method for operating a fuel gas manufacturing device for stopping the operation in such a manner that the operation can be immediately resumed, while keeping facilities from becoming complex.

Means for Solving Problem

The present invention is a method for operating a fuel gas manufacturing device that includes a desulfurizing unit that desulfurizes source gas that is heavy hydrocarbon gas, a reforming unit that reforms desulfurized source gas supplied from the desulfurizing unit by using water vapor to produce fuel gas that contains methane as a main component, a fuel gas return path for returning a portion of the fuel gas supplied from the reforming unit to the desulfurizing unit, and a moisture removing unit that removes moisture contained in the fuel gas supplied from the reforming unit, and the operation method has a characteristic configuration in which when operation is stopped while supply of the source gas to the desulfurizing unit is stopped, after supply of the source gas to the desulfurizing unit and discharge of the fuel gas to the outside are stopped, a standby operation process is performed in which the fuel gas is circulated by a circulation driving unit in such a manner that the whole amount of the fuel gas passed through the moisture removing unit is circulated through a circulation gas path to return to the desulfurizing unit and the circulated fuel gas is heated by a heating unit to a set standby temperature to heat the reforming unit to a temperature that is equivalent to an operation temperature at which the reforming is performed, and supply of the water vapor is continued in a state where a supply amount of the water vapor is at least an amount with which carbon deposition due to thermal decomposition of the fuel gas can be prevented and is smaller than an amount that is supplied when the reforming is performed.

It should be noted that heavy hydrocarbon gas in the present invention means hydrocarbons in the form of gas that has a larger molecular weight than that of methane, and includes propane, butane, ethane, and isobutane. A main component is a component that is contained in a large amount out of main active components. In particular, the main component is not required to be contained at a ratio higher than 50%, and is also not required to be contained at the highest ratio. However, it is more preferable that the main component is contained at a ratio higher than 50%, and if the ratio is not higher than 50%, it is preferable that the main component is contained at the highest ratio.

That is, when the operation is stopped while the supply of the source gas to the desulfurizing unit is stopped, the supply of the source gas to the desulfurizing unit and discharge of the fuel gas to the outside are stopped, and thereafter the standby operation process is performed in which the fuel gas is circulated by the circulation driving unit in such a manner that the whole amount of the fuel gas passed through the moisture removing unit is circulated through the circulation gas path to return to the desulfurizing unit and the circulated fuel gas is heated by the heating unit to the set standby temperature to heat the reforming unit to a temperature that is equivalent to the operation temperature at which reforming is performed, and thus the temperature of the reforming unit is kept at the operation temperature at which the operation for producing the fuel gas is performed.

Furthermore, the desulfurizing unit is heated by the circulated fuel gas, and thus the temperature of the desulfurizing unit is also kept at a temperature that is close to its temperature at which the operation for producing the fuel gas is performed.

Further, in the standby operation process, supply of water vapor is continued in a state where the supply amount of water vapor is at least the amount with which carbon deposition due to thermal decomposition of the fuel gas can be prevented and is smaller than the amount that is supplied when reforming is performed, and thus carbon deposition due to thermal decomposition of the fuel gas is prevented as a result of the supply of water vapor being continued in a state where wasting of water vapor is suppressed by reducing the supply amount to be smaller than the amount supplied when reforming is performed.

Incidentally, water vapor contained in the circulated fuel gas is removed by the moisture removing unit during the standby operation process as well, and accordingly, in order to prevent carbon deposition due to thermal decomposition of the fuel gas, the fuel gas needs to be continuously supplied with water vapor.

That is, the inventor of the present invention carried out intensive studies and found that carbon deposition due to thermal decomposition of the fuel gas can be prevented if water vapor is continuously supplied in an amount that is smaller than the amount supplied when reforming is performed but is at least the amount with which carbon deposition due to thermal decomposition of the fuel gas can be prevented, while the temperatures of the reforming unit and the desulfurizing unit are kept at temperatures close to their temperatures at which the operation for producing the fuel gas is performed.

In a state in which the standby operation process is performed, the temperature of the reforming unit is kept at the operation temperature in the operation state in which the fuel gas is produced, and the temperature of the desulfurizing unit is also kept at a temperature close to its temperature in the operation state in which the fuel gas is produced, and accordingly, when the operation for producing the fuel gas is to be resumed in the state in which the standby operation process is performed, the operation can be immediately resumed without the need to increase the temperatures of the reforming unit and the desulfurizing unit.

That is, according to the characteristic configuration of the method for operating a fuel gas manufacturing device of the present invention, the operation can be stopped in such a manner that the operation can be immediately resumed, while keeping facilities from becoming complex.

The method for operating a fuel gas manufacturing device according to the present invention has a further characteristic configuration in which a first heating unit that heats the fuel gas to be returned from the reforming unit to the desulfurizing unit and a second heating unit that heats the fuel gas to be supplied from the desulfurizing unit to the reforming unit are each provided as the heating unit.

That is, the fuel gas to be returned from the reforming unit to the desulfurizing unit can be heated by the first heating unit and the fuel gas to be supplied from the desulfurizing unit to the reforming unit can be heated by the second heating unit, and therefore the desulfurizing unit and the reforming unit can be suitably kept at high temperatures while suppressing condensation of water vapor.

That is, the fuel gas passed through the reforming unit and to be introduced into the desulfurizing unit and the fuel gas passed through the desulfurizing unit and to be introduced into the reforming unit can be heated by the first heating unit and the second heating unit, and therefore all of the circulated fuel gas can be suitably heated and consequently the desulfurizing unit and the reforming unit can be suitably kept at high temperatures while suppressing condensation of water vapor.

That is, according to the further characteristic configuration of the method for operating a fuel gas manufacturing device of the present invention, the desulfurizing unit and the reforming unit can be suitably kept at high temperatures while suppressing condensation of water vapor.

The method for operating a fuel gas manufacturing device according to the present invention has a further characteristic configuration in which heating by the first heating unit is controlled to maintain the set standby temperature based on a detection temperature that is detected by a first temperature sensor that detects a temperature of the fuel gas discharged from the desulfurizing unit, and heating by the second heating unit is controlled to maintain the set standby temperature based on a detection temperature that is detected by a second temperature sensor that detects a temperature of the fuel gas discharged from the reforming unit.

That is, as a result of the temperature of the fuel gas passed through the desulfurizing unit being detected by the first temperature sensor and heating by the first heating unit being controlled to maintain the set standby temperature, the temperature of the desulfurizing unit can be suitably kept at a temperature close to its temperature in the operation state in which the fuel gas is produced. Also, as a result of the temperature of the fuel gas passed through the reforming unit being detected by the second temperature sensor and heating by the second heating unit being controlled to maintain the set standby temperature, the temperature of the reforming unit can be suitably kept at a temperature that is equivalent to the operation temperature at which reforming is performed.

That is, as a result of the fuel gas passed through the desulfurizing unit and the fuel gas passed through the reforming unit being kept at the set standby temperature, the temperatures of the desulfurizing unit and the reforming unit can be suitably kept at temperatures that are close to their temperatures in the operation state in which fuel gas is produced.

Incidentally, the temperature of the desulfurizing unit in the operation state and the temperature of the reforming unit in the operation state normally differ from each other, and accordingly the set standby temperature for fuel gas passed through the desulfurizing unit and the set standby temperature for fuel gas passed through the reforming unit may be set to different temperatures.

That is, according to the further characteristic configuration of the method for operating a fuel gas manufacturing device of the present invention, the temperatures of the desulfurizing unit and the reforming unit can be suitably kept close to their temperatures in the operation state in which fuel gas is produced.

The method for operating a fuel gas manufacturing device according to the present invention has a further characteristic configuration in which the fuel gas is supplied from the reforming unit to a gas consuming unit that is installed in a ship.

That is, the fuel gas manufacturing device is installed in a ship, and the fuel gas is supplied from the reforming unit to the gas consuming unit installed in the ship. The ship is preferably a transport ship that transports source gas.

Since a state in which production of the fuel gas is stopped can be immediately shifted to the operation state in which production of the fuel gas is started, supply of the fuel gas to the gas consuming unit can be immediately resumed.

Therefore, if the gas consuming unit is an internal combustion engine such as an engine that drives accessories such as an air conditioner and a generator, driving of the accessories can be immediately resumed because the supply of the fuel gas can be immediately resumed.

Incidentally, in a transport ship that transports source gas, for example, a large amount of water vapor is generated using various kinds of exhaust heat or the like, and therefore the supply of water vapor can be continued during the standby operation process without consuming energy for this particular purpose.

That is, according to the further characteristic configuration of the method for operating a fuel gas manufacturing device of the present invention, the supply of the fuel gas to the gas consuming unit can be immediately resumed.

BEST MODE FOR CARRYING OUT THE INVENTION

The following describes an embodiment of the present invention based on the accompanying drawings.

Overall Configuration of Fuel Gas Manufacturing Device

Figure 1:
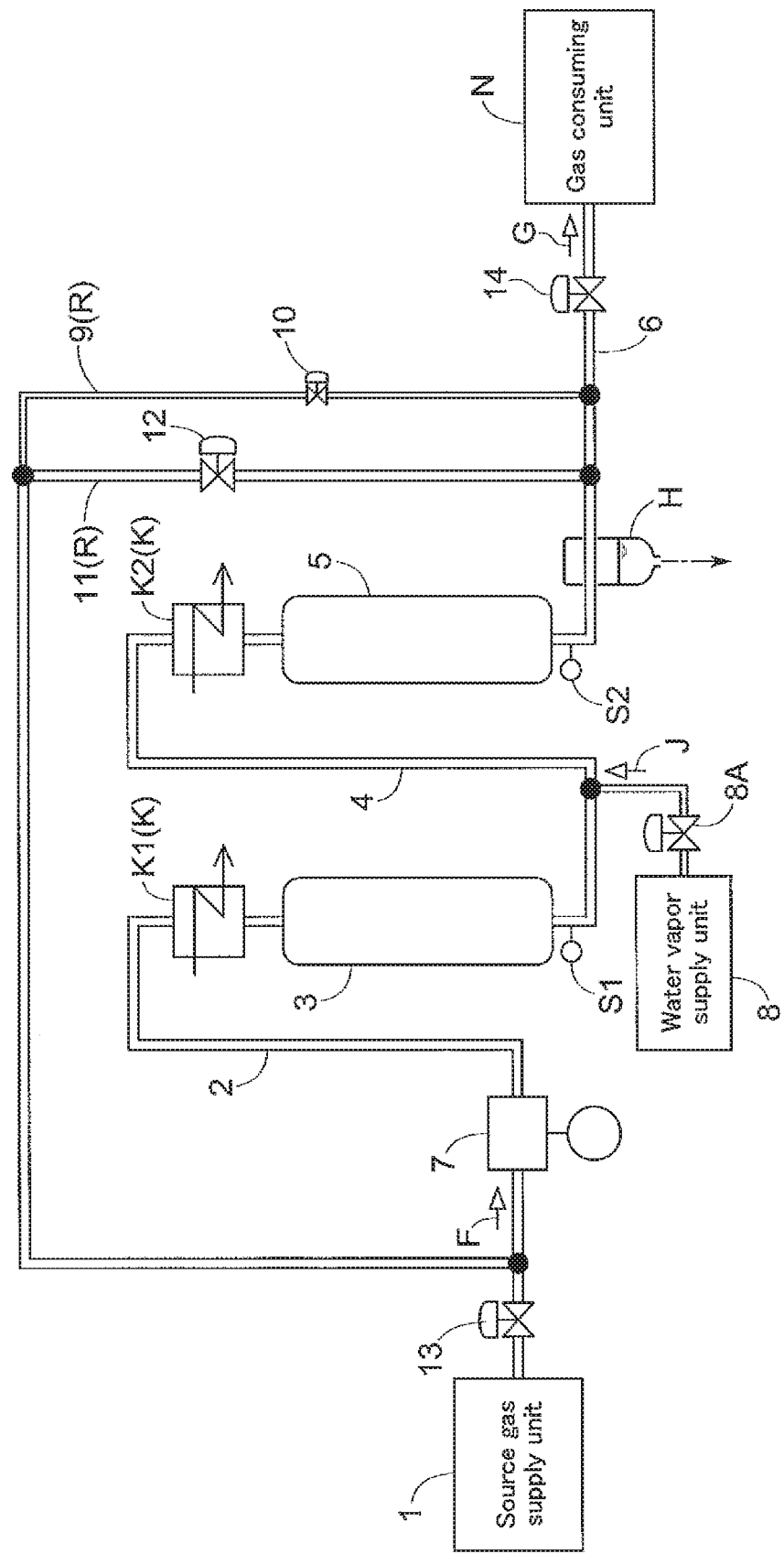
FIG. 1 is a diagram showing a flow in a fuel gas manufacturing device.

As shown in FIG. 1, a fuel gas manufacturing device includes a source gas supply unit 1 that supplies heavy hydrocarbon gas as source gas F, a desulfurizing unit 3 that desulfurizes source gas F supplied from the source gas supply unit 1 through a source gas supply line 2, a reforming unit 5 that reforms desulfurized source gas supplied from the desulfurizing unit 3 through a desulfurized gas supply line 4 by using water vapor J to produce fuel gas G that contains methane as a main component, a product gas supply line 6 that supplies fuel gas G reformed by the reforming unit 5 to a gas consuming unit N, and a moisture removing unit H that removes moisture contained in fuel gas supplied from the reforming unit 5.

In the case of an LPG (Liquefied Petroleum Gas) transport ship, for example, the source gas supply unit 1 supplies gas that is obtained by gasifying LPG through heating as source gas F, and the source gas supply line 2 is provided with a source gas compressor 7 that increases the pressure of source gas F to a suitable pressure (for example, about 0.90 MPaG).

In the case of an LPG (Liquefied Petroleum Gas) transport ship, for example, an internal combustion engine such as a gas engine that drives accessories such as an air conditioner, a generator, and the like corresponds to the gas consuming unit N, but the gas consuming unit N to which fuel gas G is supplied may be an internal combustion engine for driving the ship, such as a gas engine for driving the ship.

A water vapor supply unit 8 that supplies water vapor J to be used for reforming is connected to the desulfurized gas supply line 4. Also, a water vapor valve 8A that interrupts the supply of water vapor J from the water vapor supply unit 8 and adjusts the supply amount of water vapor J is provided.

In the case of an LPG (Liquefied Petroleum Gas) transport ship, the water vapor supply unit 8 can have a configuration for supplying water vapor J that is generated by an exhaust heat recovery boiler that recovers exhaust heat generated by various devices, for example.

A cooling unit that cools fuel gas G supplied from the reforming unit 5 is provided, although this is not shown in FIG. 1, and moisture that is generated in the fuel gas through this cooling is removed by the moisture removing unit H.

The moisture removing unit H can be constituted by a steam-water separator, a mist separator, or the like.

A main circulation gas path 11 that constitutes a circulation gas path R for returning the whole amount of fuel gas G that has been supplied from the reforming unit 5 and passed through the moisture removing unit H to the desulfurizing unit 3 in a standby operation state, which will be described later, is provided to connect a location on the product gas supply line 6 downstream of the moisture removing unit H and a location on the source gas supply line 2 upstream of the source gas compressor 7, and the main circulation gas path 11 is provided with a circulation control valve 12 that adjusts the flow amount (circulation amount) of fuel gas G and opens and closes the main circulation gas path 11.

Also, a fuel gas return path 9 for returning a portion of fuel gas G from the reforming unit 5 to the desulfurizing unit 3 is provided to connect a location on the product gas supply line 6 downstream of the moisture removing unit H and a location on the source gas supply line 2 upstream of the source gas compressor 7, and hydrogen components contained in fuel gas G are supplied as hydrogen gas for desulfurization.

It should be noted that the fuel gas return path 9 is provided with an adjustment valve 10 that adjusts the flow amount (return amount) of fuel gas G.

Incidentally, some flow path portions of the main circulation gas path 11 also serve as the fuel gas return path 9 in this embodiment.

In this embodiment, the circulation gas path R for returning the whole amount of fuel gas G from the reforming unit 5 to the desulfurizing unit 3 is constituted by the main circulation gas path 11 and the fuel gas return path 9.

It should be noted that the main circulation gas path 11 is provided in addition to the fuel gas return path 9 because the amount of gas that can flow through the adjustment valve 10 corresponds to a portion of fuel gas G supplied from the reforming unit 5, and the whole amount of fuel gas G supplied from the reforming unit 5 cannot flow through the fuel gas return path 9.

Also, a source gas valve 13 that interrupts the supply of source gas is provided at a location on the source gas supply line 2 upstream of a location at which the main circulation gas path 11 is connected to the source gas supply line 2, and the supply of source gas can be stopped in the standby operation state described later.

A product gas valve 14 that opens and closes the product gas supply line 6 is provided at a location on the product gas supply line 6 downstream of locations at which the fuel gas return path 9 and the main circulation gas path 11 are connected to the product gas supply line 6, and the supply of fuel gas G can be stopped by closing the product gas supply line 6 in the standby operation state described later.

Further, a first heating unit K1 that heats fuel gas G to be returned from the reforming unit 5 to the desulfurizing unit 3 and a second heating unit K2 that heats fuel gas G to be supplied from the desulfurizing unit 3 to the reforming unit 5 are provided as heating units K that heat fuel gas G that is circulated through the circulation gas path R in the standby operation state described later.

In this embodiment, the first heating unit K1 and the second heating unit K2 are constituted by electric heaters.

Normal Operation State

Figure 2:
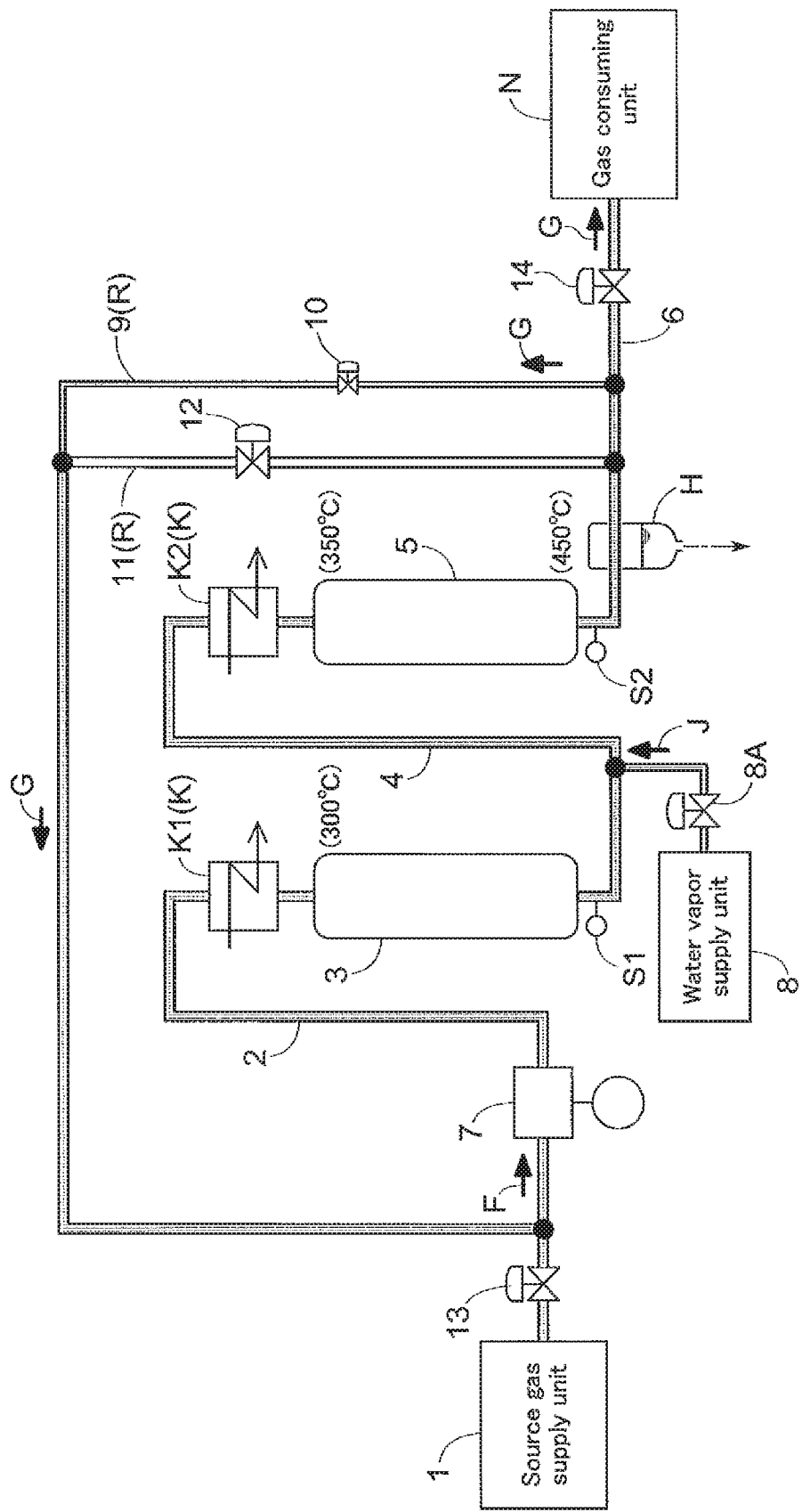
FIG. 2 is a diagram showing a flow in a normal operation state.

In a normal operation state, source gas supplied from the source gas supply unit 1 is desulfurized, the desulfurized source gas is reformed using water vapor J to produce fuel gas G, and the produced fuel gas G is supplied to the gas consuming unit N through the product gas supply line 6, in a state where the source gas valve 13 and the product gas valve 14 are open, the water vapor valve 8A is open to supply water vapor, the adjustment valve 10 is open, and the circulation control valve 12 is closed as shown in FIG. 2.

In this normal operation state, the temperature on the inlet side of the desulfurizing unit 3 is about 300° C., the temperature on the inlet side of the reforming unit 5 is about 350° C., and the temperature on the outlet side of the reforming unit 5 is about 450° C., because a reforming reaction that occurs in the reforming unit 5 is an exothermic reaction.

Incidentally, a nickel-based or noble metal-based low-temperature water vapor reforming catalyst can be used as a reforming catalyst that is loaded in the reforming unit 5, for example, and specifically, a non-conductive porous material that has minute pores and is coated by a film made of a metal selected from a group consisting of palladium, silver, nickel, cobalt, and copper is preferably used.

A desulfurizing catalyst that is loaded in the desulfurizing unit 3 is a combination of a nickel-molybdenum-based or cobalt-molybdenum-based catalyst and zinc oxide that serves as an adsorbent, for example. That is, sulfur components that are contained in source gas are removed by reducing non-active sulfur compounds contained in the source gas to hydrogen sulfide through a hydrogenation reaction using the catalyst and adsorbing the reduced hydrogen sulfide using zinc oxide.

The supply amount of water vapor J from the water vapor supply unit 8 is adjusted such that a ratio S/C (water vapor/carbon) is 0.4 to 0.8, for example. Although a detailed description is omitted in this embodiment, the supply amount of source gas F is detected using a flow amount sensor, and water vapor J in an amount according to the supply amount of source gas F is supplied from the water vapor supply unit 8.

Operation Method for Stopping Operation

When the operation is stopped while the supply of source gas F to the desulfurizing unit 3 is stopped, that is, when the operation is stopped while the supply of source gas F to the desulfurizing unit 3 is stopped in the above-described normal operation state, the supply of source gas F to the desulfurizing unit 3 and discharge of fuel gas G to the outside are stopped by closing the source gas valve 13 and the product gas valve 14, and thereafter a standby operation process is performed.

Figure 3:
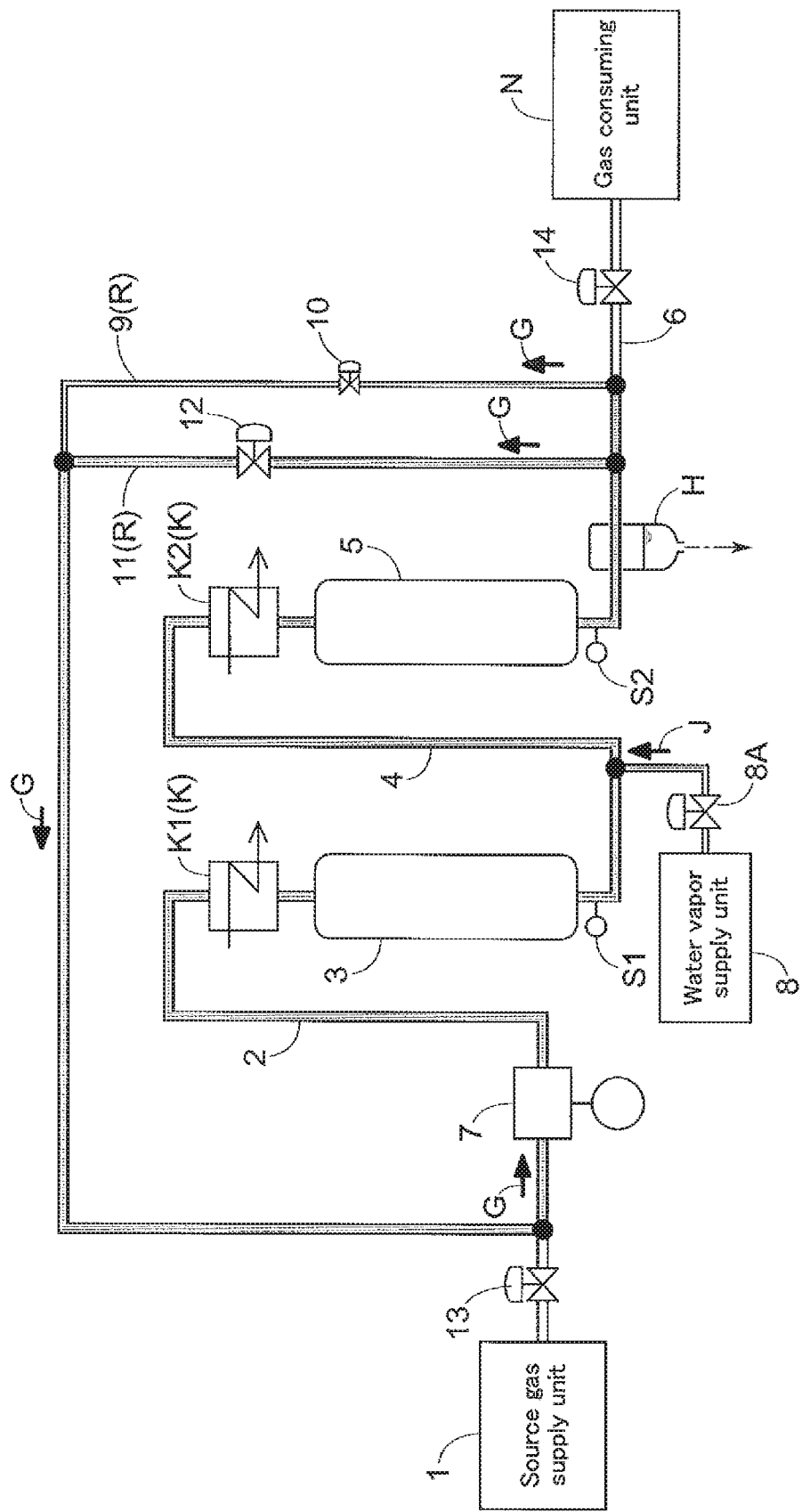
FIG. 3 is a diagram showing a flow in a standby operation state.

In the standby operation state in which the standby operation process is performed, as shown in FIG. 3, fuel gas G is circulated by the source gas compressor 7 that serves as a circulation driving unit in such a manner that the whole amount of fuel gas G passed through the moisture removing unit H is circulated through the circulation gas path R to return to the desulfurizing unit 3 and the circulated fuel gas G is heated by the heating units K to a set standby temperature to heat the reforming unit 4 to a temperature that is equivalent to an operation temperature at which reforming is performed.

Additionally, supply of water vapor J from the water vapor supply unit 8 is continued in a state where the supply amount of water vapor J is at least an amount with which carbon deposition due to thermal decomposition of fuel gas G can be prevented and is smaller than an amount that is supplied when reforming is performed.

More specifically, in the standby operation process, fuel gas G is circulated by the source gas compressor 7 serving as the circulation driving unit in such a manner that the whole amount of fuel gas G passed through the moisture removing unit H is returned to the desulfurizing unit 3 through the circulation gas path R with the adjustment valve 10 and the circulation control valve 12 open, in a state where the supply of water vapor J from the water vapor supply unit 8 is continued.

While the temperatures of the reforming unit 4 and the desulfurizing unit 3 are kept at temperatures close to their temperatures in the operation state in which fuel gas G is produced, by heating circulated fuel gas G by using the heating units K, the supply amount of water vapor J from the water vapor supply unit 8 is adjusted to be at least an amount with which carbon deposition due to thermal decomposition of fuel gas G can be prevented and smaller than an amount that is supplied when reforming is performed.

The supply amount of water vapor J is adjusted such that the ratio S/C (water vapor/carbon) with respect to the circulated fuel gas G is 0.1 to 0.5, for example.

Although an example is described in this embodiment in which the fuel gas return path 9 is kept open in the standby operation process to circulate the whole amount of fuel gas G, which is supplied from the reforming unit 5, through the main circulation gas path 11 and the fuel gas return path 9, the fuel gas return path 9 may be closed in the standby operation process to circulate the whole amount of fuel gas G, which is supplied from the reforming unit 5, through the main circulation gas path 11.

That is, the present invention may also be carried out in a configuration in which only the main circulation gas path 11 serves as the circulation gas path R.

In this embodiment, the first heating unit K1 that heats fuel gas G to be returned from the reforming unit 5 to the desulfurizing unit 3 and the second heating unit K2 that heats fuel gas G to be supplied from the desulfurizing unit 3 to the reforming unit 5 are provided as the heating units K as described above, and fuel gas G to be discharged from the desulfurizing unit 3 is heated to a first set standby temperature of 300° C., for example, and fuel gas G to be discharged from the reforming unit 5 is heated to a second set standby temperature of 400° C., for example.

That is, a first temperature sensor S1 that detects the temperature of fuel gas G discharged from the desulfurizing unit 3 is provided, and heating by the first heating unit K1 is controlled based on a temperature detected by the first temperature sensor S1 such that the temperature of fuel gas G discharged from the desulfurizing unit 3 is kept at the first set standby temperature (for example, 300° C.).

Also, a second temperature sensor S2 that detects the temperature of fuel gas G discharged from the reforming unit 5 is provided, and heating by the second heating unit K2 is controlled based on a temperature detected by the second temperature sensor S2 such that the temperature of fuel gas G discharged from the reforming unit 5 is kept at the second set standby temperature (for example, 400° C.).

The first set standby temperature (for example, 300° C.) is a temperature that is suitable for heating the desulfurizing unit 3 to a temperature that is equivalent to an operation temperature at which the desulfurizing unit 3 performs desulfurization, and the second set standby temperature (for example, 400° C.) is a temperature that is suitable for heating the reforming unit 5 to a temperature that is equivalent to an operation temperature at which the reforming unit 5 performs reforming.

It should be noted that a control unit that controls heating by the first heating unit K1 and the second heating unit K2 is provided to automatically control heating by the first heating unit K1 and the second heating unit K2 based on detection information obtained from the first temperature sensor S1 and the second temperature sensor S2, although a detailed description thereof is omitted in this embodiment.

As a result of fuel gas G discharged from the reforming unit 5 and fuel gas G discharged from the desulfurizing unit 3 being kept at the set standby temperatures as described above, the temperatures of the desulfurizing unit 3 and the reforming unit 5 are set to temperatures that are close to their temperatures in the normal operation state.

Since the desulfurizing unit 3 and the reforming unit 5 are kept at temperatures close to their temperatures in the normal operation state, the desulfurizing unit 3 and the reforming unit 5 need not be heated when resuming the operation for producing fuel gas G, and the operation for producing fuel gas G can be immediately resumed.

That is, when the operation for producing fuel gas G is to be resumed, for example, water vapor is supplied and thereafter source gas F is supplied, and the need to heat the desulfurizing unit 3 and the reforming unit 5 to suitable temperatures is eliminated, and therefore the operation for producing fuel gas G can be immediately resumed.

Other Embodiments

Next, other embodiments will be listed.

(1) In the above-described embodiment, an example is described in which the set standby temperature (first set standby temperature) for fuel gas passed through the desulfurizing unit 3 and the set standby temperature (second set standby temperature) for fuel gas passed through the reforming unit 5 are set to different temperatures in a case where the first heating unit K1 and the second heating unit K2 are provided as the heating units K, but the set standby temperature for fuel gas passed through the desulfurizing unit 3 and the set standby temperature for fuel gas passed through the reforming unit 5 may be set to the same temperature by, for example, setting the set standby temperature for fuel gas passed through the reforming unit 5 to the set standby temperature for fuel gas passed through the desulfurizing unit 3.

(2) In the above-described embodiment, an example is described in which the first heating unit K1 and the second heating unit K2 are provided as the heating units K, but the specific configuration of the heating units K can be changed by, for example, providing the second heating unit K2 and omitting the first heating unit K1.

(3) In the above-described embodiment, an example is described in which the source gas compressor 7 is provided on the source gas supply line 2, but a source gas supply blower can be provided instead of the source gas compressor 7 if the pressure of source gas supplied from the source gas supply unit 1 is increased to a suitable pressure, and in this case, the circulation driving unit can be constituted by the source gas supply blower.

(4) In the above-described embodiment, a gas storage unit that stores fuel gas G may be provided, and fuel gas stored in the gas storage unit may be supplied to the circulation gas path R in the standby operation state if the pressure of circulated fuel gas G becomes lower than a suitable pressure.

(5) In the above-described embodiment, an example is described in which fuel gas G is supplied from the reforming unit 5 to the gas consuming unit N installed in an LPG transport ship, but the present invention can be applied to various ships such as a ship that transports fuel gas F.

It should be noted that the configurations disclosed in the above-described embodiments (including the other embodiments, the same applies below) can be applied in combination with configurations disclosed in other embodiments so long as no contradiction is incurred, the embodiments disclosed in the present specification are mere examples, and embodiments of the present invention are not limited to those disclosed in the present specification and can be modified as appropriate without departing from the object of the present invention.

DESCRIPTION OF REFERENCE SIGNS

3: Desulfurizing unit
5: Reforming unit
7: Circulation driving unit
9: Fuel gas return path
11: Main circulation gas path
F: Source gas
G: Fuel gas
H: Moisture removing unit
J: Water vapor
K: Heating unit
K1: First heating unit
K2: Second heating unit
R: Circulation gas path
S1: First temperature sensor
S2: Second temperature sensor

The invention claimed is:

1. A method for operating a fuel gas manufacturing device, wherein the fuel gas manufacturing device comprises:
   a desulfurizing unit configured to desulfurize a heavy hydrocarbon source gas to produce a desulfurized source gas,
   a reforming unit configured to reform the desulfurized source gas by using water vapor to produce fuel gas, wherein the fuel gas comprises methane as a main component,
   a fuel gas return path configured to return a portion of the fuel gas supplied from the reforming unit to the desulfurizing unit,
   a moisture removing unit configured to remove moisture contained in the fuel gas supplied from the reforming unit to produce a dry fuel gas, and
   a circulation driving unit configured to route the dry fuel gas upstream of the desulfurization unit;
   the method further comprises performing a standby operation comprising:
   a) closing the source gas valve and the product gas valve;
   b) routing the dry fuel gas in its entirety to a point upstream of the desulfurizing unit and after the source gas valve as a circulated fuel gas,
   c) heating the circulated fuel gas by a heating unit set to a standby temperature equivalent to a non-standby operation reforming temperature, and
   d) continuing to supply water from a water vapor supply unit situated between the desulfurizing unit and the reforming unit in an amount sufficient to prevent thermal decomposition of the fuel gas and subsequent carbon deposition, and wherein the amount of supplied water vapor is less than the amount in non-standby reforming.

2. The method for operating a fuel gas manufacturing device according to claim 1,
   wherein a first heating unit that heats the fuel gas to be returned from the reforming unit to the desulfurizing unit and a second heating unit that heats the fuel gas to be supplied from the desulfurizing unit to the reforming unit are each provided as the heating unit.

3. The method for operating a fuel gas manufacturing device according to claim 2,
   wherein heating by the first heating unit is controlled to maintain the set standby temperature based on a detection temperature that is detected by a first temperature sensor that detects a temperature of the fuel gas discharged from the desulfurizing unit, and heating by the second heating unit is controlled to maintain the set standby temperature based on a detection temperature that is detected by a second temperature sensor that detects a temperature of the fuel gas discharged from the reforming unit.

4. The method for operating a fuel gas manufacturing device according to claim 1,
   wherein the fuel gas is supplied from the reforming unit to a gas consuming unit that is installed in a ship.

* * * * *